United States Patent
CaraDonna et al.

(10) Patent No.: US 8,190,587 B1
(45) Date of Patent: May 29, 2012

(54) IN-PLACE IMAGE PROMOTION

(75) Inventors: Joseph CaraDonna, Ashland, MA (US); Amol Dixit, Cambridge, MA (US)

(73) Assignee: Network Appliance, Inc., Sunnyvale, CA (US)

( * ) Notice: Subject to any disclaimer, the term of this patent is extended or adjusted under 35 U.S.C. 154(b) by 731 days.

(21) Appl. No.: 12/333,212

(22) Filed: Dec. 11, 2008

(51) Int. Cl.
*G06F 7/00* (2006.01)
*G06F 9/44* (2006.01)

(52) U.S. Cl. ......... 707/694; 707/695; 717/168; 717/169

(58) Field of Classification Search .................. 717/125, 717/170, 172, 168, 169; 707/694, 695
See application file for complete search history.

(56) References Cited

U.S. PATENT DOCUMENTS

| | | | | |
|---|---|---|---|---|
| 5,615,400 A | * | 3/1997 | Cowsar et al. | 719/332 |
| 5,832,270 A | * | 11/1998 | Laffra et al. | 717/125 |
| 6,151,683 A | * | 11/2000 | Wookey | 714/2 |
| 6,859,923 B2 | * | 2/2005 | Taylor | 717/172 |
| 6,918,113 B2 | * | 7/2005 | Patel et al. | 709/219 |
| 2004/0088694 A1 | * | 5/2004 | Ho | 717/170 |

\* cited by examiner

*Primary Examiner* — Vincent Boccio
(74) *Attorney, Agent, or Firm* — Blakely, Sokoloff, Taylor & Zafman LLP

(57) ABSTRACT

To promote an image, an identification of at least one of an symbol name and an existing symbol value associated with the symbol name is received. An identification of a new symbol value is also received. It is then determined that a binary file that is a component of an unpromoted image is to be modified, wherein the image has previously been compiled and linked. The binary file is read to find occurrences of at least one of the symbol name or the existing symbol value in the binary file. The existing symbol value is replaced with the new symbol value to promote the image. The image is promoted without recompiling or relinking the binary file.

21 Claims, 4 Drawing Sheets

| Symbol Name | String Value Example - Unpromoted | String Value Example - Promoted |
|---|---|---|
| version | OS NAME Internal Name.1.0.1: Mon Mar 26 02:17:45 EDT 2007 /u/user/work/myarea APPLICATION_DEBUG | OS NAME 1.0.1 |
| osrelease | Internal Name.1.0.1 | 1.0.1 |
| ostype | OS NAME | unmodified |
| kern_ident | OS_DEBUG | unmodified |
| osreldate | 600034 | unmodified |

Figure 3

IN-PLACE IMAGE PROMOTION

TECHNICAL FIELD

Embodiments of the present invention relate to image promotion, and more specifically to performing image promotion in-place (without copying a source tree), and without recompiling or relinking any portion of the image.

BACKGROUND

To finalize version information, remove unnecessary information and/or disable unnecessary functionality, a program or operating system is promoted before it is shipped to end users. In some conventional promotion techniques, promoting a program or operating system requires copying an entire source tree (a hierarchical collection of files and directories that holds the source code to a body of software). Software components within the source tree are then modified to change file names, change the values of symbols within files, disable functions, etc. Once the files within the source tree have been modified, the software is recompiled and relinked. The promoted software can then be shipped to the end user. In other conventional promotion techniques, version information is contained within a single version file. A program or operating system is promoted by modifying the contents of the version file, recompiling the modified version file and relinking the modified version file.

Conventional promotion techniques introduce a number of problems. First, copying the source tree requires considerable time and resources. The extensive time and resources that are required to copy source trees make it so that promotion can only be performed on an infrequent basis. Therefore, developers often are not able to test the promoted version before it is shipped. Furthermore, changing bits within software introduces risk. Recompiling software and relinking software to complete image promotion both change numerous bits of the software, and can result in software that is inoperable or that functions at a suboptimal level. Once a build has been successfully compiled and linked, it is undesirable to recompile and/or relink the build or any file included in the build. However, in conventional promotion processes, such recompiling and relinking is necessary. Moreover, the concepts of performing a system build and performing a promotion are typically intertwined such that when a system build is performed, promotion is also performed. Such intertwining further reduces a developer's ability to check promoted software before it is sent to end users.

SUMMARY

To promote an image, identifications of a symbol name and/or an existing symbol value associated with the symbol name are received. Identification of a new symbol value is also received. It is then determined that a binary file that is a component of an unpromoted image is to be modified. The unpromoted image is an executable image that has been linked and compiled. The binary file is read to locate the symbol name and/or the existing symbol value in the binary file. For each occurrence of the symbol name or existing symbol value, the existing symbol value is replaced with the new symbol value to promote the image. Such image promotion is achieved without recompiling or relinking the binary file.

BRIEF DESCRIPTION OF THE DRAWINGS

The present invention is illustrated by way of example, and not by way of limitation, and can be more fully understood with reference to the following detailed description when considered in connection with the figures in which:

FIG. 3 is a table comparing state differences between a promoted and unpromoted build for a kernel included in an operating system, in accordance with one embodiment of the present invention.

DETAILED DESCRIPTION

The present invention includes various operations and processes, which will be described below. The operations and processes of the present invention may be implemented by specially-designed hardware components (e.g., circuitry, dedicated logic, programmable logic, microcode, etc.) or may be implemented by a programmable hardware device executing machine-executable instructions (e.g., software). Alternatively, the operations may be performed by a combination of these approaches.

At least portions of the present invention may be provided as a computer program product, or software, that may include a machine-readable medium having stored thereon instructions, which may be used to program a computer system (or other electronic devices) to perform a process according to the present invention. A machine-readable medium includes any mechanism for storing information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.).

In embodiments of the present invention, an unpromoted image of an operating system or program is promoted. An unpromoted image is an executable image (e.g., an image including one or more executable binary files) that includes information and/or features not meant to be seen or used by an end user. Unpromoted images are typically compiled and linked. Promoting an image involves versioning the software (e.g., changing from an internal code name to a release number), removing information not meant to be seen by the end user, and/or disabling features not meant to be used by the end user. In one embodiment, the unpromoted image is promoted using an image promoter and a binary stamper. The image promoter generates a copy of the unpromoted image, and determines how binary files included in the image should be modified. The binary stamper reads the binary files included in the image, and replaces the occurrences of one or more existing symbol values with new symbol values. The unpromoted image is promoted without copying a source tree structure, without relinking any binary file, and without recompiling any binary file. Accordingly, the promoted image can be generated in the same source tree in which the unpromoted image is located, and with a minimum of changes to bits in the image. The promoted image can then be deployed to end users. Deployment includes distributing the promoted image to the end user and/or installing the promoted image at an end user system.

Figure 1A:
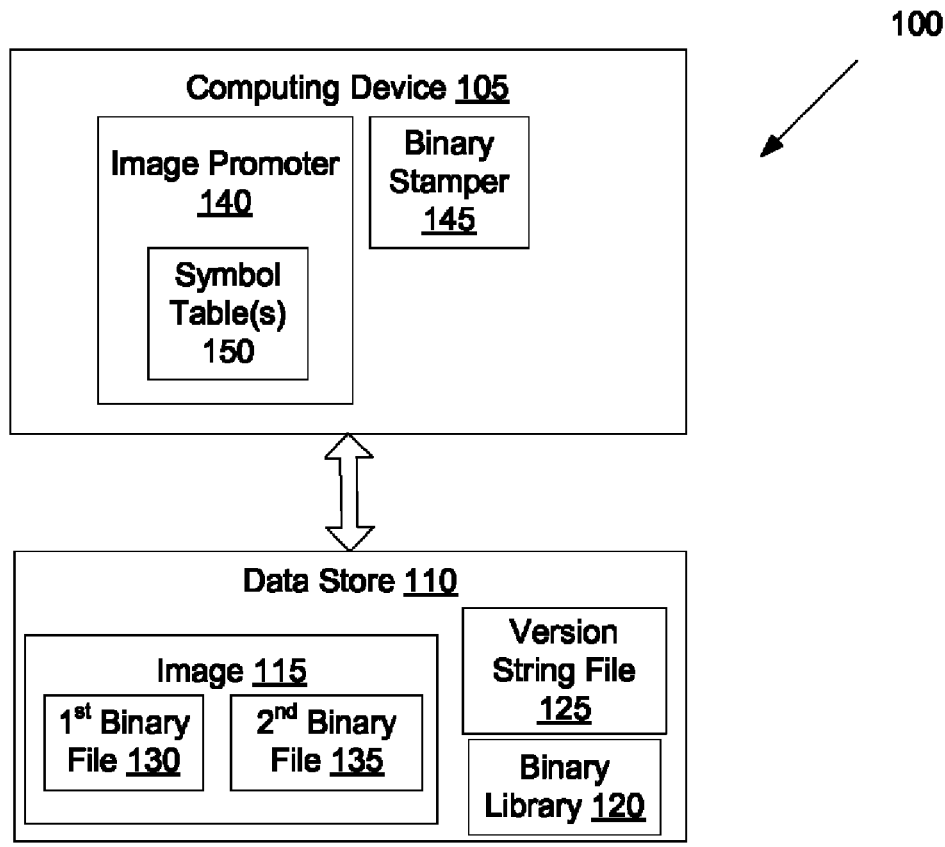
FIG. 1A illustrates an exemplary computing system, in which embodiments of the present invention can operate.

FIG. 1A illustrates an exemplary computing system 100, in which embodiments of the present invention can operate. The computing system 100 includes a computing device 105 connected with a data store 110 directly or via a network. The computing device 105 may include a desktop computer, laptop computer, server, etc. The data store 110 may be a hard disk drive, a tape backup drive, an optical drive, or other nonvolatile storage medium. The computing device 105 may write data to and/or read data from the data store 110.

In one embodiment, the data store 110 includes an image 115 of a software build that is ready for release to an end user. The image 115 may be an image of a new program, or an image of an update (e.g., a patch) to an existing program. The image 115 may also be an image of a new operating system, or an image of an update to an existing operating system. In one embodiment, the image 115 is a tarball (a single file package that combines multiple smaller files while preserving filesystem information such as permissions, dates, and directory structures). In a further embodiment, the image 115 is a compressed tarball (e.g., a tarball that has been compressed). Alternatively the image 115 may have some other archive file format and/or compression file format. Examples of other archive and/or compression file formats include the library file format used in MSDOS, the Unix Archiver file format, the Lempel-Ziv-Welch (LZW) compression format, the Archived by Robert Jung (ARJ) file format, the disk image file format used by the Apple® Operating Systems, the zip file format, and so on.

The image 115 includes multiple binary files (e.g., first binary file 130 and second binary file 135. Each binary file 130, 135 contains information that has been encoded into binary form (a series of 1s and 0s). The binary files 130, 135 include bytes (sequences of 8 bits) that are intended to be interpreted as text, instructions, sounds, etc. The binary file 130, 135 may be, for example, a compiled file, a script file, an object file, etc.

Binary files 130, 135 include multiple symbols, each of which has a symbol name and an associated symbol value. When a program is written in any language above direct machine code, symbolic names are given to functions and data (e.g., variables). Compilers generate symbol information along with code during compilation. These symbolic names can be stored as symbols in the executable file. Symbol names are means of addressing the symbols in the binary files 130, 135. The symbol names enable symbols to be identified so that the symbol values associated with the symbol names can be read, used and/or modified. Symbol values can be strings (e.g., text strings or ASCII strings) or numeric constants.

Most programs and libraries are, by default, compiled with debugging symbols included. If a binary (executable) is not stripped, the binary has information about all symbols stored in the form of a symbol table. Symbol tables are used by linkers and debuggers to link or debug files at runtime. For example, Executable and Linkable Format (ELF) is a portable object file format supported by most UNIX and modern day operating systems. Sharable objects and dynamic executables of ELF format usually have 2 distinct symbol tables, ".symtab", and the other ".dynsym". The ELF symbol table is a list of 'struct Elf32_Sym' structures (or Elf64_Sym for 64-bit binaries), one for each symbol:

```
typedef struct {
    Elf32_Word      st_name;
    Elf32_Addr      st_value;
    Elf32_Word      st_size;
    unsigned char   st_info;
    unsigned char   st_other;
    Elf32_Half      st_shndx;
} Elf32_Sym;
```

The exact meaning for some of these symbols depends on the type of symbol involved.

Preferably, the binary files 130, 135 each share the same binary file format, though mixed file formats can be used. In one embodiment, the binary files 130, 135 are each executable and linking format (ELF) files. In another embodiment, the binary files 130, 135 are each Windows® new executable (NE) files, which include files having the .exe extension and those having the .dll extension. In yet another embodiment, the binary files are each Mach object (Mach-O) files. Alternatively, other binary file formats may be used.

Figure 1B:
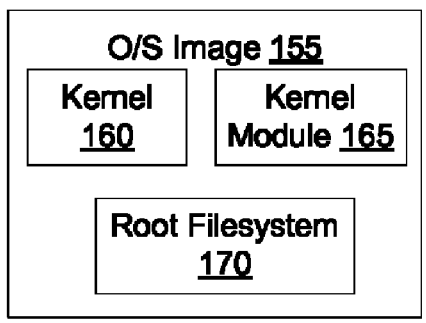
FIG. 1B illustrates an example operating system (O/S) image, in accordance with one embodiment of the present invention.

FIG. 1B illustrates an example operating system (O/S) image 155 that may be stored in data store 110 of FIG. 1A, in accordance with one embodiment of the present invention. The O/S image 155 may be an image of a complete operating system or an image of an update to an operating system. The O/S image 155 includes a kernel 160, a kernel module 165 and a root filesystem 170, each of which has the same binary file format.

The kernel 160 is a central component of the operating system that manages communication between hardware and software components. The kernel 160 provides the lowest logical abstraction layer for resources such as system memory, processors, input/output devices, etc. The kernel 160 may be a monolithic kernel, a microkernel, or a hybrid kernel.

The kernel module 165 is a binary file that can be loaded and unloaded into the kernel 160 upon demand. The kernel module 165 extends the functionality of the kernel 160 without requiring a system reboot. The kernel module 165 may add support for new hardware, new filesystems, new system calls, etc. For example, one type of kernel module 165 is a device driver, which allows the kernel 160 to access hardware connected to the computing device 105. Without kernel modules 165, it would be necessary to build monolithic kernels and add new functionality directly to the binary file of the kernel 160.

The root filesystem 170 is a filesystem that is mounted by the kernel 160 at startup. The root filesystem 170 includes a basic filesystem structure, a minimum set of directories, utilities, configuration files, and devices, and a runtime library. When the operating system is booted, the root filesystem 170 is mounted on a computing device. In one embodiment, the root filesystem 170 includes embedded files (e.g., embedded binary files such as an embedded kernel or embedded kernel modules). Embedded binary files can be accessed and modified by mounting the root filesystem, as discussed in greater detail below.

Figure 1C:
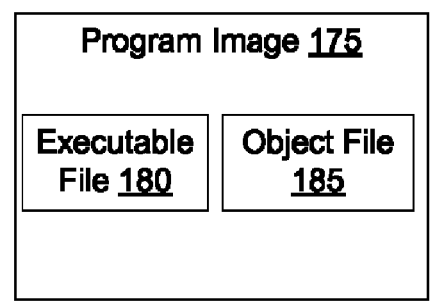
FIG. 1C illustrates an example program image, in accordance with another embodiment of the present invention.

FIG. 1C illustrates an example program image 175 that may be stored in data store 110 of FIG. 1A, in accordance with another embodiment of the present invention. The program image 175 may be an image of a complete program or an image of an update to a program. The program image 175 in one embodiment includes an executable file 180 and an object file 185, each of which has the same binary file format. The executable file 180 supplies information necessary for an operating system to create a process image suitable for executing code and accessing data contained within the executable file 180. The object file 185 includes data for use by a process initiated by the executable file 180.

Returning to FIG. 1A, in one embodiment, the data store 110 includes a version string file 125 that controls versioning of binary files. In one embodiment, the version string file 125 is a one line file (e.g., a text file) that includes a new version string (e.g., 1.0.1) that will be used to replace an old version string (e.g., internal_developer_name_1.0.1). The version string file 125 can be used to replace an existing value (the old version string) with a new value (the new version string) for multiple different symbols, as discussed in greater detail below.

In one embodiment, the computing device 105 includes an image promoter 140 and a binary stamper 145. The image promoter 140 and the binary stamper 145 act together to modify the contents of the binary files 130, 135 within the image 115 to promote the image 115. Modifying the contents of the binary files 130, 135 includes disabling developer features, modifying filenames, removing source tree paths, modifying versioning information, and so on. The image promoter 140 and binary stamper 145 can automatically modify the contents of the binary files in-place (without copying a source tree associated with the binary files), and without a need to recompile or relink any objects.

In one embodiment, the image promoter 140 determines binary files 130, 135 to modify, symbol names, and replacement symbol values, and passes this information on to the stamper 145. Alternatively, the image promoter 140 may determine existing symbol values rather than, or in addition to, determining the symbol names. The stamper 145 then replaces an existing symbol value with a replacement symbol value for each occurrence of the symbol names and/or for each occurrence of the existing symbol values.

In one embodiment, the image promoter 140 includes one or more symbol tables 150 (not to be confused with the symbol tables that may be included in binary files). Alternatively, the image promoter 140 may include other data structures such as trees, arrays, matrices, etc. The symbol tables 150 (or other data structures) include one or more pairs of a symbol name and a symbol value. In each pair of a symbol name and a symbol value, the symbol name identifies a symbol in a binary file 130, 135, and the symbol value represents a new symbol value that will replace an existing symbol value associated with the symbol name. The symbol tables 150 (or other data structures) each identify which symbols need to have their values changed, and what the replacement values are, for a specific binary file or set of binary files. The symbol tables 150 (or other data structures) may also identify what the existing symbol values are. In one embodiment, the symbol tables 150 are hash maps of symbol names, existing symbol values and/or replacement symbol values.

An example symbol table 150 for a kernel binary may include, for example, the following entries:

| Version | => | ("O/S NAME"_"replacement_value"), |
|---|---|---|
| Osrelease | => | ("replacement_value"), |
| Promotion_ status | => | ("Promoted") | where the keys on the left hand side of the "=>" are the symbol names within the binary files, and the entries on the right hand side of the "=>" represent replacement symbol values associated with the symbol names. In the example symbol table, each occurrence of "replacement_value" indicates that the symbol should be modified such that the replacement symbol value replaces any existing symbol value for the symbol identified by the symbol name. In one embodiment, each occurrence of "replacement_value" is replaced with the new version string of the version string file 125. Thus, the version string file 125 can be used to update the values for multiple symbols. In one embodiment, the symbol table 150 also identifies the existing symbol values that are being replaced.

In one embodiment, the stamper 145 used the symbol table (e.g., the .symtab symbol table described above) of non-stripped binaries to find the address (offset) of the symbol within the binary. The stamper 145 can then overwrite the symbol's original contents with new symbol value. In one embodiment, stamper 145 uses st_name for symbol name comparison, st_size for symbol size information and st_value to find the offset of the symbol within the binary file so that we can modify the symbol value.

In one embodiment, the image promoter 140 and the binary stamper 145 are combined into a single logic. The combined image promoter/binary stamper may perform all of the functions of the image promoter 140 and the binary stamper 145. The image promoter 140 and the binary stamper 145 are discussed in greater detail below with reference to FIG. 2.

Figure 2:
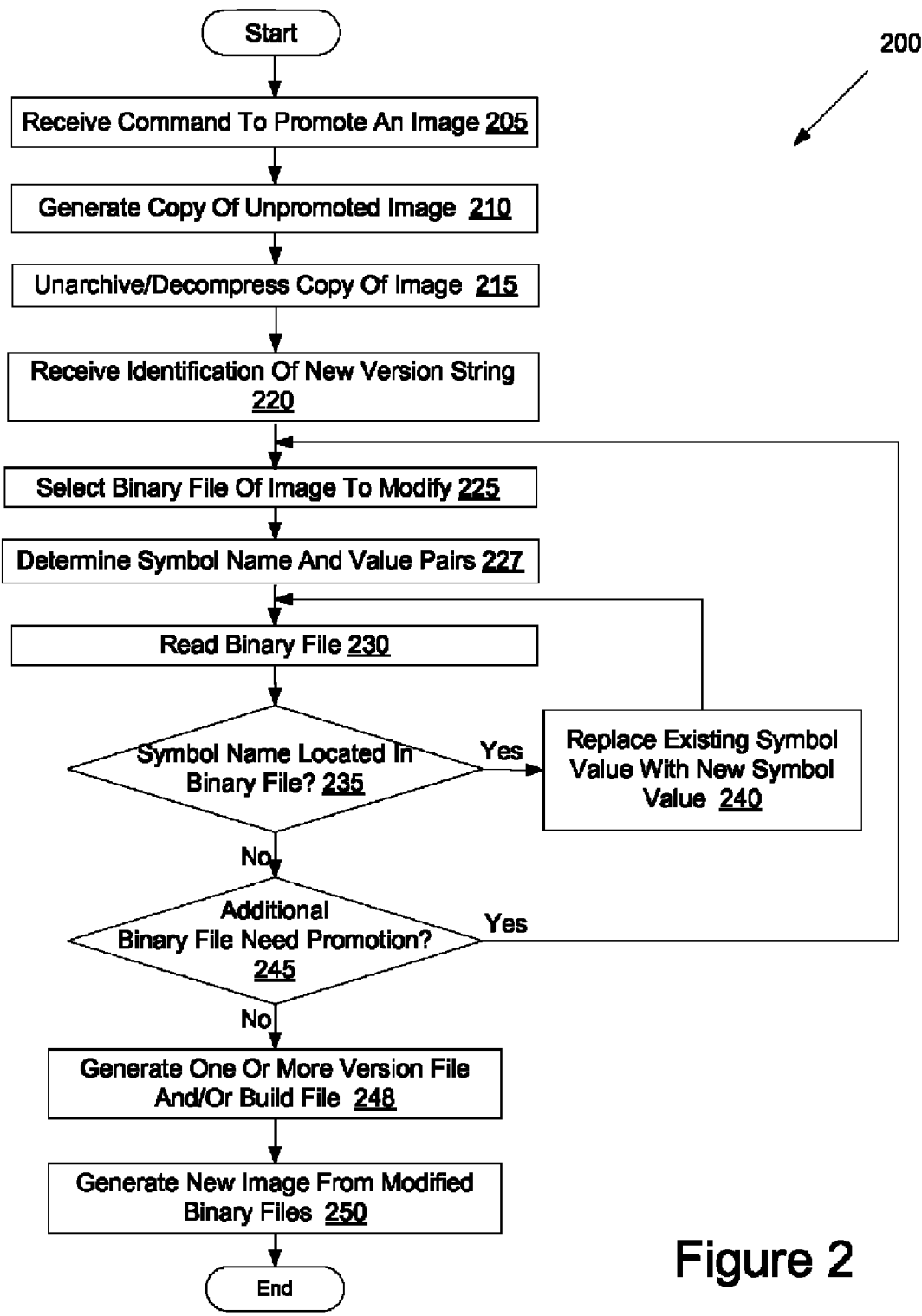
FIG. 2 is a flow diagram illustrating one embodiment of a process for promoting an image.

FIG. 2 is a flow diagram illustrating one embodiment of a process 200 for promoting an image. In one embodiment, the promotion process affects two system characteristics: runtime state and software versioning. The runtime state controls what mode a program or operating system will operate in. An unpromoted mode enables various developer commands and capabilities, while a promoted mode disables them. The software versioning is the name and number assigned to a software build. There are many ways to express this information, some of which assists the development process, but which should not be exported to the end user. Such software versioning expressions are removed. In one embodiment, process 200 is performed by image promoter 140 and binary stamper 145 of FIG. 1A.

Referring to FIG. 2, an image promoter receives a command to promote one or more unpromoted images (block 205). The command may be received from an application, or from a user (e.g., a software developer) via a command line interface or via a graphical interface. In one embodiment, the image promoter locates the image when promotion of the image is requested. The image promoter is either preconfigured with a location of the image (e.g., a location in a data store 110), or is capable of searching to find the image. In one embodiment, the image is located in a source tree, and the image promoter is preconfigured with the location information.

At block 210, the image promoter generates a copy of the unpromoted image. The copy may be generated in a source tree in which the unpromoted image resides. In one embodiment, the copy is generated in a new directory within the source tree. It should be noted that the image promoter and binary stamper can perform image promotion without copying the source tree for the image.

At block 215, the image is unarchived and/or decompressed using standard archiving and/or compression techniques. For example, if the image has been compressed into a zip file format, the image is unzipped using a decompression application that can decompress zip files.

At block 220, the image promoter receives an identification of a new version string (name and/or number assigned to the software build). The identification may be received from a version string file, or may be received from a user via a command line interface. The version string file may have been prepared specifically for the image that is being promoted. An example of a version string is "1.0.1." Before method 200 is initiated, the version string file may be updated to reflect a new value for the version string. The new value for the version string may be used to modify multiple symbols within a binary file. For example, the value for the new version string may be used as the replacement value that is used to update each of the symbols identified by the symbol names in the above example symbol table discussed with reference to FIG. 1A.

Referring to FIG. 2, at block 225, the image promoter selects a binary file of the image to modify. The image typically includes multiple different binary files. Some or all of the binary files may need to be modified to complete promotion. These binary files may be modified concurrently or one at a time by one or more stampers. In one embodiment, the image includes a single version binary file that includes all versioning information for the image that is modified, and no other binary files within the image are modified If the image is an O/S image (as shown in FIG. 1B), then some files may be embedded in a root filesystem. The root filesystem may have a filesystem type that is different than a filesystem type maintained on a data store that stores a source tree for the image. For example, the root filesystem may have a .NTFS filesystem type, and the data store may have a .JFS filesystem type. For root filesystems that have a filesystem type that matches the filesystem type of the data store, the root filesystem can be mounted in a temporary directory. If the filesystem types do not match, the image promoter loads a virtual filesystem on top of the filesystem of the data store. The virtual filesystem specifies an interface between the root filesystem and the filesystem of the data store. Using the virtual filesystem, the root filesystem can be mounted in a temporary directory. The file or files within the root filesystem can then be accessed.

At block 227, the image promoter determines which symbol or symbols should have their existing symbol values replaced in the selected binary file. In one embodiment, such a determination is made by examining the selected binary file, and determining a symbol table to use for the binary file. The symbol table may identify symbol names for each symbol that needs its existing symbol value to be replaced, and the replacement symbol value to use. Different symbol tables may be used for different types of binary files. For example, if an O/S image is being promoted, the image promoter may have separate symbol tables for a kernel module, for a kernel and for a root filesystem. If the selected binary file is a kernel module, for example, then a kernel module symbol table may be used Likewise, if the program image were being promoted, the image promoter may include a separate symbol table for an object file and for an executable file. In one embodiment, the image promoter identifies one or more symbol names and one or more new symbol values for the symbols identified by the symbol names from the selected symbol table (e.g., symbol table 150 of FIG. 1A). Alternatively, the image promoter may identify existing symbol values and replacement symbol values that will be used to replace the existing symbol values from the selected symbol table.

In one embodiment, the image promoter initiates a binary stamper to read and modify the binary file or binary files. Alternatively, the image promoter may initiate multiple binary stampers to read the binary files. The image promoter may call the binary stamper separately for each binary file. For each binary file, the image promoter may then pass the binary stamper appropriate symbol names, existing symbol values and/or replacement symbol values, and an appropriate file name. In one embodiment, each binary stamper receives a pair of a symbol name and a replacement symbol value.

At block 230, a binary stamper reads the selected binary file. In one embodiment, the binary stamper reads the selected binary file using a binary library. The binary library enables reading of bit sequences of a specific binary format as particular instructions, characters, sounds, etc. For example, if the binary library includes the ASCII character set, a binary file can be read as a string of ASCII characters (text). If a read binary file was encoded using the ASCII character set, then the text would be meaningful. Otherwise, the text would be random ASCII characters. In one embodiment, a separate binary library is used for each binary file format. For example, if the binary file is an ELF binary, then the binary stamper accesses an ELF binary library. Alternatively, the binary library may be configured to read multiple binary formats.

In an alternative embodiment, the binary stamper includes a binary search algorithm that enables the binary stamper to read bit sequences of the binary file to locate symbol names and/or existing symbol values. In such an embodiment, a binary library may not be necessary.

At block 235, the binary stamper determines whether a symbol name (or existing symbol value) is present in the binary file. The binary stamper reads the binary file (e.g., using an appropriate binary library or a binary search algorithm). The binary stamper searches within the binary file for each occurrence of the symbol name (or existing symbol value). Each symbol name has a fixed size and fixed characteristics. The size and characteristics are known from the structure of the symbol name. Likewise, each existing symbol value also has a size and characteristics that can be searched for. Therefore, a known symbol name (or existing symbol value) can be quickly found within the binary file. In one embodiment, the binary stamper reads specific portions of the binary file.

In one embodiment, symbols whose values are to be changed are located within a dedicated section of the binary file that stores only version information by the binary stamper. This isolates the version information, and makes such information easier to find. Moreover, stamping the binary file may introduce some risk due to the fact that bits are being changed. By separating the version information from other types of information, the risk of replacing critical bits is reduced, making stamping of the binary file less risky. Finally, by separating the version information from other information in the binary file, testing and verification of the binary file is made easier. By targeting only the areas of the binary file that need modification, the binary file may be read quickly. It should be noted that stamping a binary file changes significantly fewer bits than recompiling and/or relinking a binary file.

If the symbol name is present in the binary file, the binary stamper locates the symbol name in the binary file, and the method proceeds to block 240. The binary stamper locates the symbol name in the binary file in one embodiment by obtaining a section header of a section of the binary file that contains the symbol name. From the section header and the symbol name structure, the stamper calculates the exact location of the symbol name in the binary file. Once the location of the symbol name is discovered, the location of the existing symbol value is also known. If the symbol name is not present in the binary file, the method proceeds to block 245.

At block 240, the stamper replaces an existing symbol value associated with the symbol name with the new (replacement) symbol value. Wherever the symbol name is found, the associated existing symbol value is replaced with the associated replacement symbol value. For example, if the symbol name is "version number," the existing symbol value being replaced is "XYZ," and the replacement symbol value is "ABC," then the binary stamper can replace each occurrence of "XYZ" that is associated with the symbol name "version number" with "ABC".

In one embodiment, the binary stamper modifies a value of a release status variable. If the binary file is an executable file, it contains instructions that, when executed by a processor, cause the processor to perform one or more actions. Some actions that can be performed by the executable file are developer functions that are not necessary for ordinary operation. One variable in such a binary file is a release status variable. When the release status variable has the value "unpromoted", developer functions are enabled. When the release status variable has the value "promoted", developer functions are disabled. In one embodiment, developer functions are enabled or disabled via an IF-ELSE statement. The statement designates that IF the variable is equal to "promoted", the function is not performed. Therefore, by modifying the release status's symbol value (variable's value) to "promoted," developer functions are disabled.

In one embodiment, the binary stamper modifies symbol values that include internal developer names and paths. Typically, there are numerous symbol values that are used in development that a developer does not want to be presented to an end user. For example, when a build is completed, the version string of the binary files may contain path information of the source tree in which they were generated. This information is typically not distributed to end users. Therefore, the version string of the release may be modified to remove the path name. For example, the version string "APPLICATION NAME Internal Name.1.0.1: Mon Mar 26 02:17:45 EDT 2007 /u/user/work/myarea OS DEBUG" may be replaced with the version string "APPLICATION NAME 1.0.1."

The method then returns to block 230, and the binary stamper continues to read the binary file.

At block 245, the image promoter determines whether any additional binary files need promotion. If one or more binary files still need to be promoted, the method returns to block 230, and a binary stamper reads a selected binary file (e.g., using an appropriate binary library or binary search algorithm). If no more binary files need to be promoted, the method proceeds to block 248.

At block 248, one or more version files and/or build files are generated. For example, a version file and a build file may be generated for each binary file that was promoted. In an operating system image, some version files and build files reside at the top level of a root filesystem. Other version files and build files may reside in other locations. A version file is a simple text file that identifies the build version of the image (e.g., 1.0.1). The build file is a compiled version of an operating system or program that is either in testing or ready to be promoted.

At block 250, the image promoter generates a new image from the modified binary files. Generating the new image can include archiving the binary files and/or compressing the binary files. However, generating the new image is performed without recompiling or relinking any binary files in the image. In one embodiment, the new image has a same file type as the original image.

In one embodiment, the image promoter promotes multiple images concurrently or serially. The image promoter may receive a list of images to promote, and may call on a binary stamper to modify the binary files for each of the images in the list. In another embodiment, multiple image promoters and multiple binary stampers operate concurrently to promote a package of images. Each pair of an image promoter and a binary stamper may modify binary files of a distinct image within the package.

The promotion process 200 decouples the concepts of performing a system build and performing promotion. This decoupling enables a software developer to promote a build at any time to test the promoted version. For example, the developer may check the promoted build to determine which features are enabled and which features are disabled in the promoted version.

If at any point during execution of process 200 an error occurs, all progress can be undone, and any promoted images and their directories can be deleted. Such an error might occur, for example, if an existing symbol name in a symbol comparison file is incorrect. Such an error would cause the stamper to fail to identify any occurrences of the specified existing symbol name.

FIG. 3 is a table that shows contents of an image before and after promotion, in accordance with one embodiment of the present invention. Specifically, FIG. 3 illustrates a comparison between symbols of a promoted build and an unpromoted build for a kernel included in an operating system image. The table identifies multiple symbols by their symbol names, an unpromoted string value (existing symbol value) for each symbol and a promoted string value (new symbol value) for each symbol.

The kernel includes a version symbol, an operating system release (osrelease) symbol, an operating system type (ostype) symbol, a kernel identifier (kern_ident) symbol and an operating system release date (osreldate) symbol. Of these symbols, the symbol values for the version symbol and the osrelease symbol are modified during promotion. Since the version symbol is an exported symbol (a symbol viewable by an end user), it should not contain pathname information when the build is promoted. However, having the pathname of the source tree where the image was built is useful for development purposes. Therefore, for unpromoted builds the version contains the full path and timestamp information. On promotion, the version includes only the name of the operating system and the version number.

Release names are often given code names or other internal names by developers. These code names and internal names help to distinguish particular builds, but are not necessary for end users to know. Therefore, the osrelease symbol is modified during promotion to remove an internal developer release name for the release and/or replace the developer release name with a promoted release name.

Figure 4:
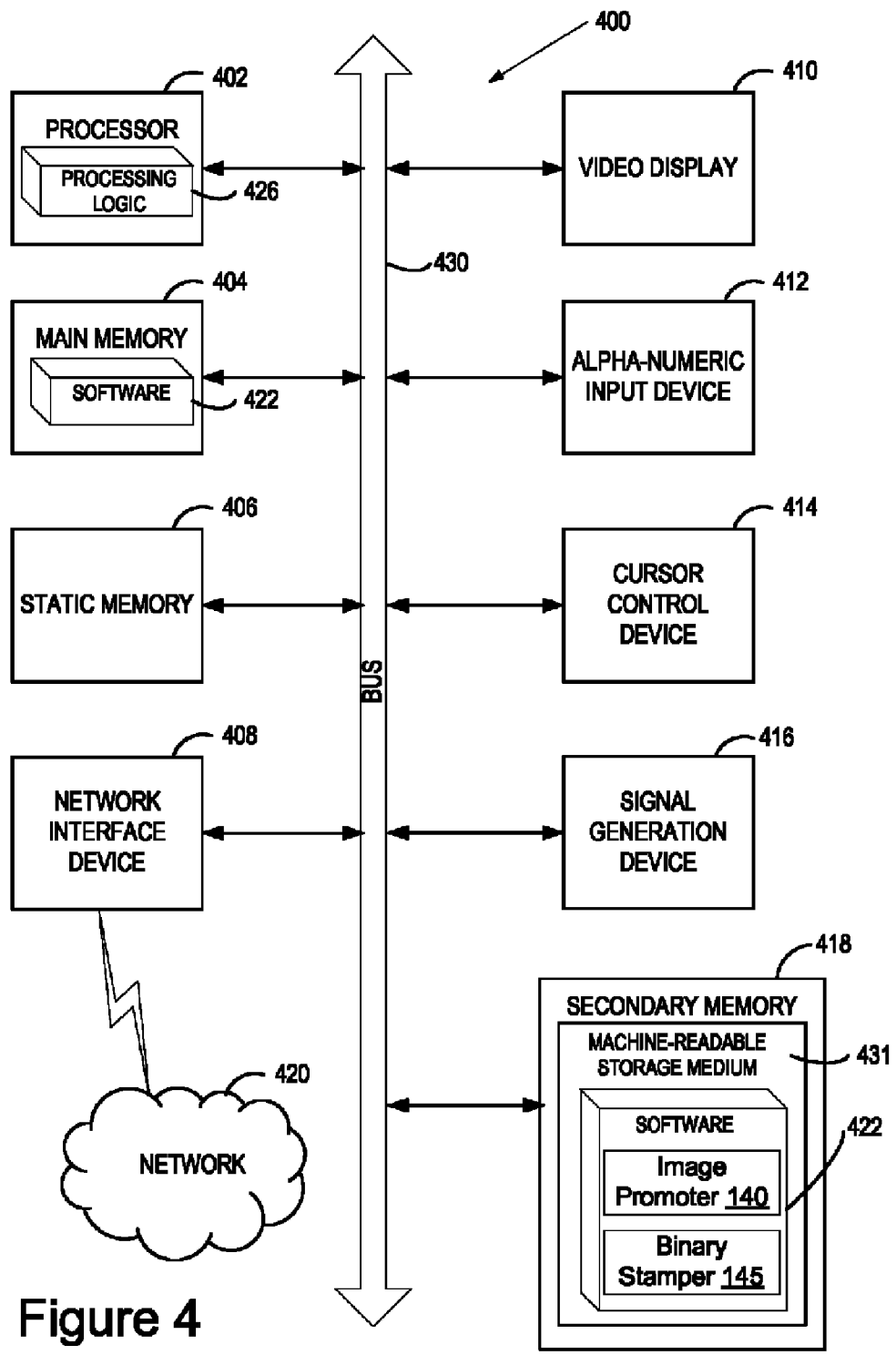
FIG. 4 illustrates a diagrammatic representation of a machine in the exemplary form of a computer system, in accordance with one embodiment of the present invention.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 418 (e.g., a data storage device), which communicate with each other via a bus 430.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The secondary memory 418 may include a machine-readable storage medium (or more specifically a computer-readable storage medium) 431 on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-readable storage media. The software 422 may further be transmitted or received over a network 420 via the network interface device 408.

The machine-readable storage medium 431 may also be used to store an image promoter 140 and/or a stamper 145 of FIG. 1A, and/or a software library containing methods that call image promoters and/or stampers. While the machine-readable storage medium 431 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computerized method of promoting an image comprising:
   receiving, in an image promoter, an identification of at least one of a symbol name and an existing symbol value associated with the symbol name;
   receiving, in the image promoter, an identification of a new symbol value;
   determining, in the image promoter, a binary file to modify, wherein the binary file is a component of a compiled and linked unpromoted image that is executable;
   reading, in a binary stamper, the binary file to find occurrences of at least one of the symbol name or the existing symbol value in the binary file; and
   replacing, by the binary stamper, the existing symbol value with the new symbol value to promote the image, wherein the image is promoted without recompiling and relinking the binary file, wherein the promoted image and the unpromoted image are generated in a same source tree, and wherein the unpromoted image is promoted prior to release from a test environment.

2. The method of claim 1, wherein the existing symbol value is an old version string that is used for development of the image and wherein the new symbol value is a new version string that is used for deployment of the image, the method further comprising:
   removing a path of a development tree from the old version string.

3. The method of claim 1, wherein the existing symbol value is a developer release name and the new symbol value is a promoted release name.

4. The method of claim 1, wherein the existing symbol value is associated with an unpromoted build and the new symbol value is associated with a promoted build, the method further comprising:
   disabling developer features included in the image by replacing occurrences of the existing symbol value with occurrences of the new symbol value.

5. The method of claim 1, further comprising:
   receiving identification of a plurality of symbol names and of a plurality of new symbol values associated with the plurality of symbol names; and
   using a hash table to determine new symbol values with which to replace existing symbol values associated with the plurality of symbol names.

6. The method of claim 1, further comprising:
   generating a copy of the image and decompressing the copy of the image, wherein the determining, the reading and the replacing are all performed on the copy of the image.

7. An apparatus comprising:
   a memory including instructions for promoting an image; and
   a processor, connected with the memory, to execute the instructions, wherein the instructions cause the processor to include:
   an image promoter to receive an identification of at least one of a symbol name or an existing symbol value associated with the symbol name, to receive an identification of a new symbol value, and to determine a binary file to modify, wherein the binary file is a component of a compiled and linked unpromoted image that is executable; and a binary stamper to read the binary file to find occurrences of at least one of the symbol name or the existing symbol value in the binary file, and to replace the existing symbol value with the new symbol value to promote the image, wherein the image is promoted without recompiling and relinking the binary file, wherein the promoted image and unpromoted images are generated in a same source tree, and wherein the unpromoted image is promoted prior to release from a test environment.

8. The apparatus of claim 7, wherein the existing symbol value is an old version string that is used for development of the image and wherein the new symbol value is a new version string that is used for deployment of the image, the apparatus further comprising:
the binary stamper to remove a path of a development tree from the old version string.

9. The apparatus of claim 8, wherein the existing symbol value is a developer release name and the new symbol value is a promoted release name.

10. The apparatus of claim 7, wherein the existing symbol value is associated with an unpromoted build and the new symbol value is associated with a promoted build, the apparatus further comprising:
the binary stamper to disable developer features included in the image by replacing occurrences of the existing symbol value with occurrences of the new symbol value.

11. The apparatus of claim 7, further comprising:
the image promoter to receive identification of a plurality of symbol names and a plurality of new symbol values associated with the plurality of symbol names; and
the image promoter to use a hash table to determine new symbol values with which to replace existing symbol values associated with the plurality of symbol names.

12. The apparatus of claim 7, further comprising:
the image promoter to generate a copy of the image and decompress the copy of the image, wherein the determining, the reading and the replacing are all performed on the copy of the image.

13. A system comprising:
means for receiving, in an image promoter, an identification of at least one of a symbol name and an existing symbol value associated with the symbol name;
means for receiving, in the image promoter, an identification of a new symbol value;
means for determining, in the image promoter, a binary file to modify, wherein the binary file is a component of a compiled and linked unpromoted image that is executable;
means for reading, in a binary stamper, the binary file to find occurrences of at least one of the symbol name or the existing symbol value in the binary file; and
means for replacing, in the binary stamper, the existing symbol value with the new symbol value to promote the image, wherein the image is promoted without recompiling and relinking the binary file, wherein the promoted image and the unpromoted image are generated in a same source tree, and wherein the unpromoted image is promoted prior to release from a test environment.

14. The system of claim 13, wherein the existing symbol value is an old version string that is used for development of the image and wherein the new symbol value is a new version string that is used for deployment of the image, further comprising:
means for removing a path of a development tree from the old version string.

15. The system of claim 14, wherein the existing symbol value is a developer release name and the new symbol value is a promoted release name.

16. The system of claim 13, wherein the existing symbol value is associated with an unpromoted build and the new symbol value is associated with a promoted build, further comprising:
means for disabling developer features included in the image by replacing the occurrences of the existing symbol value with occurrences of the new symbol value.

17. The system of claim 13, further comprising:
means for receiving identification of a plurality of symbol names and of a plurality of new symbol values associated with the plurality of symbol names; and
means for using a hash table to determine new symbol values with which to replace existing symbol values associated with the plurality of symbol names.

18. The system of claim 13, further comprising:
means for generating a copy of the image and decompressing the copy of the image, wherein the determining, the reading and the replacing are all performed on the copy of the image.

19. A computerized method performed in response to a request to promote an image comprising:
identifying, in an image promoter, one or more changes to be made to a binary file, the changes including updating symbol values associated with one or more symbol names, wherein the binary file is a component of a compiled and linked unpromoted image that is executable;
storing the changes in memory; and
modifying, in a binary stamper, the binary file according to the changes stored in memory to promote the image, wherein the image is promoted without recompiling or relinking the binary file, wherein the promoted image and unpromoted images are generated in a same source tree, and wherein the unpromoted image is promoted prior to release from a test environment.

20. The method of claim 19, wherein modifying the file includes finding occurrences of the one or more symbol names and replacing the symbol values associated with the one or more symbol names.

21. The method of claim 19, wherein storing the changes in the memory includes adding the changes to a data structure stored in the memory.

* * * * *